United States Patent [19]

Nakatani

[11] 3,885,245

[45] May 20, 1975

[54] SCANNING DEVICE

[75] Inventor: Mitsuo Nakatani, Gibu, Japan

[73] Assignee: Sanyo Electric Company, Ltd., Osaka, Japan

[22] Filed: Sept. 11, 1972

[21] Appl. No.: 287,610

[30] Foreign Application Priority Data

Sept. 14, 1971 Japan .............................. 46-72326
May 12, 1972 Japan .............................. 47-47426

[52] U.S. Cl. .................... 360/101; 360/86; 360/97; 360/107

[51] Int. Cl. ........................ G11b 21/02; G11b 5/82

[58] Field of Search ................ 260/101, 107, 86, 97

[56] References Cited

UNITED STATES PATENTS

| | | | |
|---|---|---|---|
| 3,596,914 | 8/1971 | Fujimoto | 360/101 |
| 3,727,921 | 4/1973 | Kato | 360/101 |
| 3,773,335 | 11/1973 | Kato | 360/101 |

*Primary Examiner*—Alfred H. Eddleman
*Attorney, Agent, or Firm*—Armstrong, Nikaido & Wegner

[57] ABSTRACT

A scanning device for a magnetic recording and/or reproducing apparatus for moving a magnetic head along a predetermined spiral path to permit the recording or reproduction of sound on a magnetically-coated frame of a photographic slide. Preferably, the scanning device includes a support member, a rotary disc rotatably mounted on the support member, a motor for rotating the rotary disc, a radially-movable magnetic head mounted on the rotary disc and a motive means operatively associated with the motor for shifting the magnetic head radially along the rotary disc concurrent with the rotation of the rotary disc so that the locus of movement of the magnetic head is a spiral. The motive means can include a rotatable cam member whose cam surface engages the magnetic head and which is rotated through the agency of a pulley attached to the rotary disc and having a planetary-like motion, which motion can be generated by connecting the pulley with a belt to the support member and causing the rotary disc to rotate. Most preferably, the scanning device further includes a detecting means for sensing a predetermined radial end position of the magnetic head; and first operative means energized by the detecting means upon sensing the predetermined radial end position to disengage the motive means from shifting the magnetic head and to reset the magnetic head back to a predetermined radial starting position.

20 Claims, 7 Drawing Figures

SCANNING DEVICE

BACKGROUND OF THE INVENTION

The present invention relates to a scanning device for a magnetic sound recording and/or reproducing device for tracing a magnetic head along a given planar-spiral curve formed on a magnetically-coated frame of the film for a photographic slide projector and further to means for resetting the magnetic head to its original position after the tracing operation.

Photographic slides have become a popular and acceptable medium for the display of visual information, since they are relatively simple and inexpensive to prepare, both individually and as quantity reproductions, and can be projected to any desired enlargement with good definition and excellent color retention. Their use in education, entertainment, industrial training, advertising and similar fields is commonplace. Because of the desirability of vocal comments in conjunction with visual projections, efforts have been undertaken to provide a system in which the projection of individual slides is accompanied by "synchronized" sound information. Such efforts have met with great difficulty, for reasons familiar to those working in the field.

One approach has been to use separate projectors and phonographs or tape reproducers, sometimes assembled in a single housing. Since separate media carry the picture and sound, automatic synchronization or complete integration of sound and picture was practically impossible.

Another approach, set forth in U.S. Pat. No. 3,159,078, is to provide a holder for supporting a slide and a sound track carrier in a spatial relationship to each other so that upon insertion of the holder in an appropriately designed device, the slide and sound track are held in operational positions for simultaneously projecting the slide and reproducing the intelligence recorded on the sound track. In this device, the sound track is a rotatable record disc having sound information recorded thereon in a spiral-like groove. To play back the recorded sound information, the record disc is rotated past a magnetic sound head of conventional design. The sound head is supported by an arm pivotally mounted and axially-slidable on a frame. The movements of the sound head relative to the disc are controlled by a guide pin riding in the spiral groove of the rotating record disc. Although this type of apparatus provides synchronous sound and visual transmission, many other disadvantages are readily apparent. Firstly, the separate insertion of the photographic slide and the record disc is both time consuming and cumbersome. Secondly, a large storage space is required since each holder contains a photographic slide and record disc disposed in a spatial relationship to each other. Finally, because of the vertical disposition of the record disc in the slide projector, the guide pin and thus the magnetic sound head are apt to become disengaged from the recorded spiral by jarring, wearing of parts or a mechanical misfit.

Another approach to providing concurrent visual and audio information for slide projectors is described in U.S. Pat. No. 3,122,054. This patent overcomes the first two problems noted above with respect to U.S. Pat. No. 3,159,078, by disposing a spiral magnetic sound track on the slide frame surrounding the film. In this patent, the scanning device for reproducing the information of the sound track consists of a rotatable disc on which is mounted the usual pick-up cartridge and stylus of a record player. The stylus is spring-biased to follow the groove of the magnetic sound track as the disc rotates. If maintained in a vertical plane, this device suffers from the potential dislodgement of the stylus from the track. In an attempt to overcome this problem, U.S. Pat. No. 3,122,054 provides an alternative embodiment in which the photographic slide and scanning device are horizontally disposed. This approach, however, requires a complex arrangement of mirrors and an inordinately large slide projector casing.

SUMMARY OF THE INVENTION

To overcome the disadvantages of the prior art, the present invention provides for a scanning device for a magnetic recording or reproducing apparatus comprising: a support member, a rotary disc rotatably mounted on said support member, a motor means operatively associated with said rotary disc for imparting rotational movement thereto, a radially-movable magnetic head mounted on said rotary disc, and motive means operatively associated with said motor means adapted to shift said magnetic head radially along said rotary disc concurrent with the rotation of the latter whereby the locus of movement of said magnetic head is a spiral. Preferably, said motive means includes a rotatable cam member having a cam surface engaging said magnetic head, said cam member being operatively associated with said motor means to translate rotational movement received therefrom into the radial movement of said magnetic head. The motive means can further include planetary wheel means rotatably mounted on said rotary disc for transmitting rotational movement imparted by said motor means to rotate said cam member. An engaging member is advantageously fixedly attached to said support member and has a circular surface with a center coinciding with the center of rotation of said rotary disc, said circular surface operatively engaging said planetary wheel means so that the rotation of said rotary disc by said motor means effects the rotation of said planetary wheel means. To rotate said rotary disc, said rotary disc can include a coaxially-mounted driving ring adapted to be circumferentially rotated by a belt connected to said motor means.

In a preferred embodiment of the invention, said motive means further includes an idler wheel axially-connected to said cam member to co-rotate therewith, said idler wheel being adapted to rotatably engage said planetary wheel means. The axis of rotation of said cam member and said idler wheel is advantageously disposed in a first end portion of an idler arm pivotally-connected to said rotary disc, said idler arm being spring-biased to maintain said idler in rotational engagement with said planetary wheel means. Suitably, said magnetic head is connected to one end of a supporting arm, the other end of which engages said cam surface of said cam member.

A further embodiment of the invention is directed to a scanning device for a magnetic recording or reproducing apparatus comprising: a support member; a rotary disc rotatably mounted on said support member; a motor means operatively associated with said rotary disc for imparting rotational movement thereto; a radially-movable magnetic head mounted on said rotary disc; motive means operatively associated with said motor means adapted to shift said magnetic head radially along said rotary disc concurrent with the rotation of the latter whereby the locus of movement of said magnetic head is a spiral; detecting means for sensing at least a predetermined radial end position of said magnetic head; and first operative means energized by said detecting means upon sensing said end position to disengage said motive means from shifting said magnetic head and to reset said magnetic head back to a predetermined radial starting position. Preferably, said scanning device further comprises an elastic means for storing kinetic energy corresponding to the displacement of said magnetic head from the predetermined radial starting position whereby, upon said disengagement of said motive means, said elastic means automatically resets said magnetic head to said predetermined radial starting position. Said motive means suitably includes a rotatable cam member having a cam surface engaging said magnetic head, said cam member being operatively associated with said motor means to translate rotational movement received therefrom into the radial movement of said magnetic head. Said motive means can further include planetary wheel means rotatably mounted on said rotary disc for transmitting rotational movement imparted by said motor means to rotate said cam member as well as an idler wheel axially-connected to said cam member to co-rotate therewith, said idler wheel being adapted to rotatably engage said planetary wheel means. In this embodiment, said first operative means is adapted to disengage said idler wheel and said planetary wheel means. Further said elastic means can be associated with said cam member for storing kinetic energy corresponding to the displacement of said magnetic head from said predetermined radial starting position whereby, upon the disengagement of said idler wheel and said planetary wheel means, said elastic means automatically resets said cam member to its initial rotational position which corresponds to said predetermined radial starting position of said magnetic head. Suitably, the axis of rotation of said cam member and said idler wheel is disposed in a first end portion of an idler arm pivotally-connected to said rotary disc, said idler arm being spring-biased to maintain said idler in rotational engagement with said planetary wheel means. Said idler arm according to one embodiment includes a second end portion, said first operative means being adapted to engage said second end portion to rotate said idler arm in a direction disengaging said idler wheel and said planetary wheel means. Said first operative means preferably comprises a spring-biased resetting lever pivotally connected to said rotary disc, one end of which engages said magnetic head; a release lever displaced from said rotary disc and adapted to engage said second end portion of said idler arm; a plunger means for actuating said release lever; and an electrical switch for actuating said plunger means when the other end of said resetting lever comes in contact therewith, said other end of said resetting lever and said electrical switch being positioned relatively such that contact occurs at the predetermined radial end position of said magnetic head.

According to a still further embodiment of the invention, the scanning device comprises: a support member; a rotary disc rotatably mounted on said support member; a motor means operatively associated with said rotary disc for imparting rotational movement thereto; a radially-movable magnetic head mounted on said rotary disc; motive means operatively associated with said motor means adapted to shift said magnetic head radially along said rotary disc concurrent with the rotation of the latter whereby the locus of movement of said magnetic head is a spiral; detecting means for sensing at least a predetermined radial end position of said magnetic head; first operative means energized by said detecting means upon sensing said end position to disengage said motive means from shifting said magnetic head and to reset said magnetic head back to a predetermined radial starting position; and second operative means for disengaging said motor means from rotating said rotary disc when said detecting means senses said predetermined radial end position of said magnetic head. Preferably, said rotary disc includes a coaxially-mounted driving ring; said motor means is provided with an axially-driven pulley in parallel with said driving ring; an idler disc is retractably disposed therebetween to transmit rotary motion to said rotary disc; and a second operative means is provided adapted to retract said idler disc when said detecting means senses said predetermined radial end position of said magnetic head. Said second operative means most suitably includes an electrically-actuated plunger means for retracting said idler disc, an electrical switch for actuating said plunger means and a stopping lever pivotally connected in a middle portion to said rotary disc and having a pair of ends, one end being adapted to engage said first-end portion of said idler arm, when said idler arm is rotated in a disengaging direction by said first operative means, in a manner such that the other end of said stopping lever actuates said electrical switch of the second operative means. Said one end of said stopping lever in a preferred embodiment is provided with a slotted portion for receiving the top of said first end portion of said idler arm, when said idler arm is rotated in said disengaging direction.

BRIEF DESCRIPTION OF THE DRAWINGS

These and other features and advantages of the present invention will become more readily apparent from the following detailed description of the invention when taken in conjunction with accompanying drawings in which.

DETAILED DESCRIPTION

In the following description, it is to be emphasized that the scanning device is the essence of the present invention. Therefore, the electrical components of the sound recording or reproducing apparatus or other elements of the slide projector are not described herein.

Figure 3:
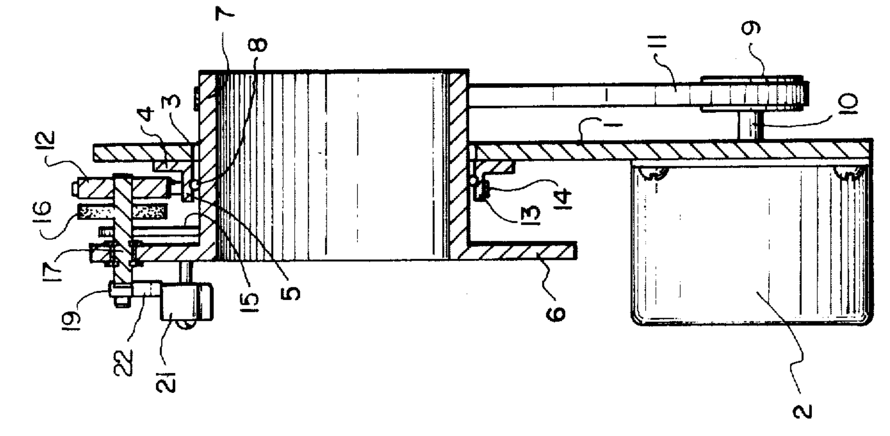
FIG. 3 is another sectional view of the embodiment of FIG. 1 taken along the sectional line B-C-D-E.
Figure 2:
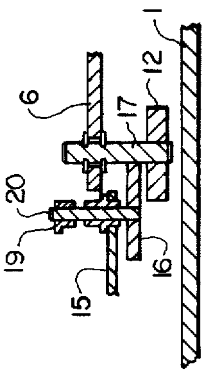
FIG. 2 is a sectional view of the embodiment of FIG. 1 taken along line A—A.
Figure 1:
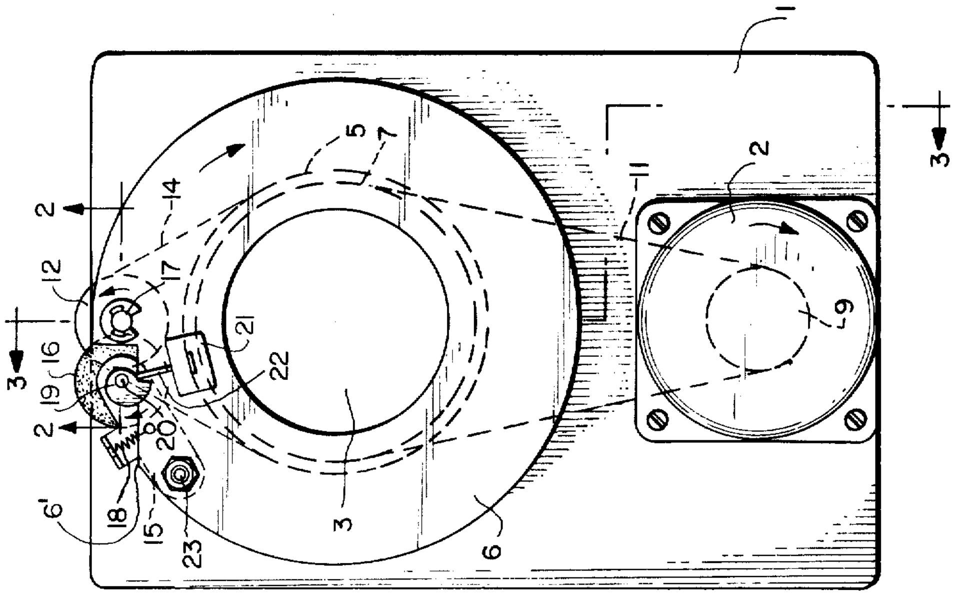
FIG. 1 is a frontal view of one embodiment of the present invention.
Figure 5:
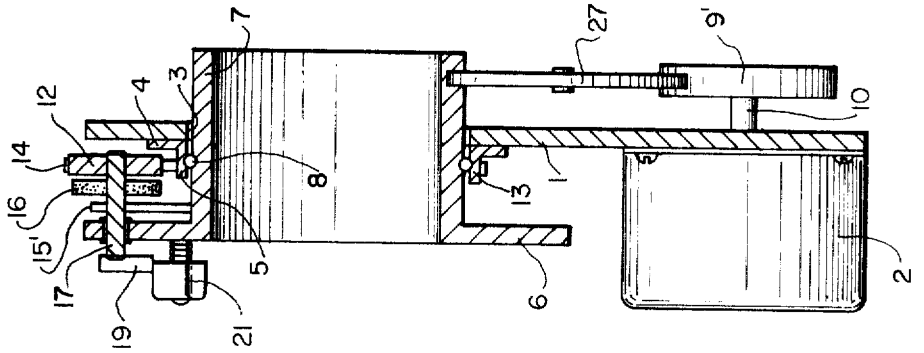
FIG. 5 is a sectional side view of the embodiment of FIG. 4.
Figure 4:
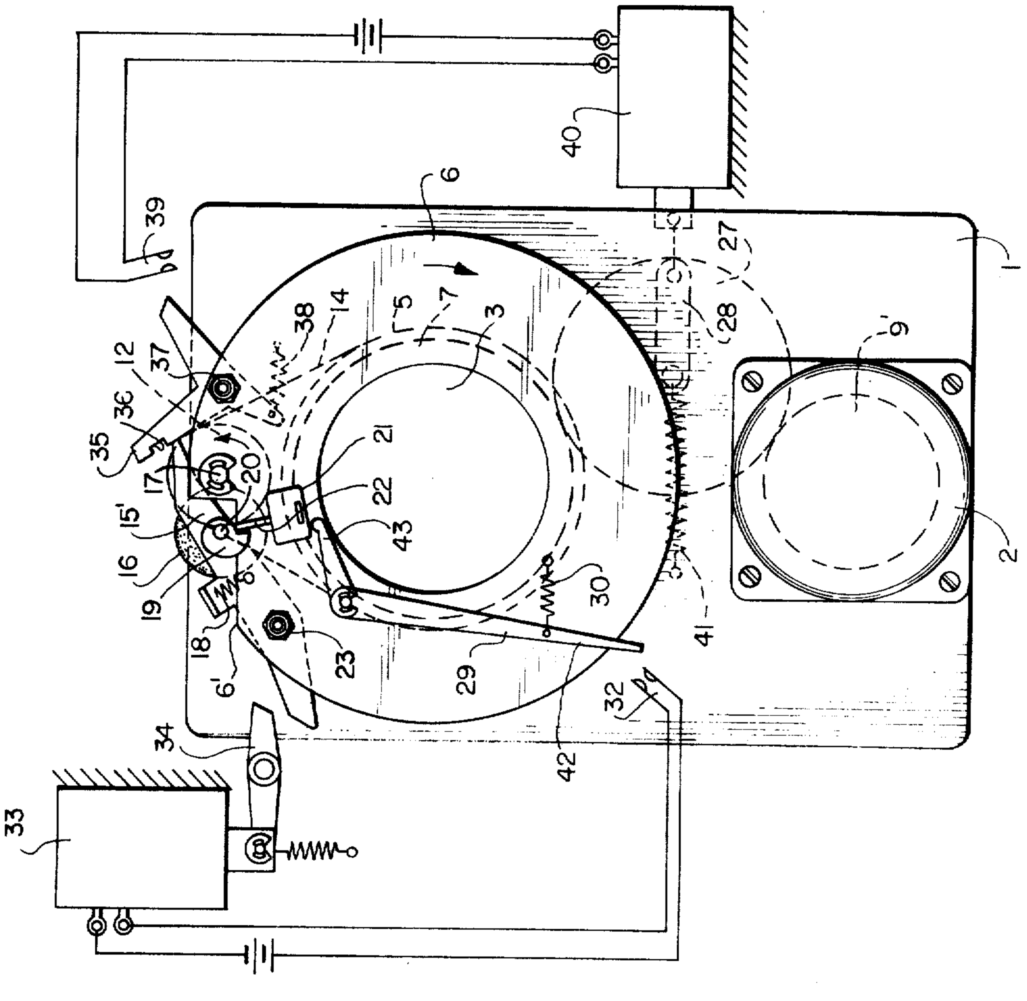
FIG. 4 is a frontal view of another embodiment of the present invention.

Also, it is to be noted that the first embodiment of the invention as covered by FIGS. 1–3 includes substantially the same parts as the second embodiment of the invention illustrated in FIGS. 4-7. Accordingly, in the interest of clarity, the same reference numerals have been used to designate identical or similar parts.

In the first embodiment, referring to FIGS. 1-3, the upper center of vertically-disposed support member 1 (illustrated as a plate) is perforated with circular opening 3 serving as the standard light channel of a slide projector. Engaging ring 4 (see FIG. 3) with bearing portion 5 is fixed on support member 1 in conforming relationship with opening 3 and rotatably seats driving ring 7 of rotary disc 6 via steel balls 8. The lower portion of support member 1 receives electrical motor 2, the driving power source of the entire scanning device.

Pulley 9 is coaxially mounted on axis 10 of electric motor 2 and engages connecting belt 11 to rotate driving ring 7 and thus rotary disc 6.

One side of rotary disc 6 is perforated to rotatably receive a planetary wheel means composed of planetary pulley 12 secured to rotating axis 17. The planetary wheel means assumes a planetary motion by virtue of connecting belt 14 circumferentially engaging planetary pulley 12 and cylindrical portion 13 of the bearing portion of engaging ring 4 (which is fixed to support member 1) when rotary disc 6 rotates.

The planetary wheel means, preferably rotating axis 17, is rotatably engaged with idler wheel 16 rotatably mounted via axis 20 on one side of idler arm 15 in a cut-out portion 6' of rotary disc 6. The other side of idler arm 15 is rotatably secured to rotary disc 6 through arm axis 23. Biasing is provided by spring 18 to maintain engaging contact between idler wheel 16 and rotating axis 17 of the planetary wheel means.

Also affixed to axis 20 is cam member 19, having a guiding cam surface following a certain Archimedian curve. In co-rotating with idler wheel 16, the cam surface of cam member 19 engages radially-slidable supporting arm 22 of magnetic head 21 to move the latter in a radial direction. From the position shown in FIG. 1, rotation of cam member 19 in accordance with the present invention would drive magnetic head 21 inwardly toward the center of rotation of rotary disc 6.

The starting point for the operation of the scanning device of the present invention is preferably as shown wherein supporting arm 22 engages the minimum diameter portion of the cam surface of cam member 19. At this point, magnetic head 21 is at the farthest possible distance from the center of rotation of rotary disc 6.

To actuate the scanning device, electric motor 2 is energized to rotate rotary disc 6 in a clockwise direction by way of connecting belt 11 as determined by the ratio of the diameter of pulley 9 and driving ring 7. Planetary pulley 12 not only rotates with rotary disc 6 but revolves counterclockwise together with rotating axis 17 under the influence of connecting belt 14. The net effect is that planetary pulley 12 and rotating axis 17 assume a planetary-like motion. With idler wheel 16 rotatably engaging rotating axis 17, cam member 19 is co-rotated in a clockwise manner shifting magnetic head 21 on supporting arm 22 inwardly in the radial direction. Since magnetic head 21 rotates with rotary disc 6 and is concurrently shifted via cam member 19 toward the center of rotary disc 6, the locus of movement of magnetic head 21 is a spiral which, in use, parallels a corresponding traced or to be traced magnetic path on the frame of the film for a photographic slide.

Needless to say, in this embodiment and, as will become subsequently apparent, in the second embodiment, a planetary gear or other means can be substituted in place of connecting belt 14 (without losing any of the features of the present invention) and also in place of connecting belt 11.

In FIGS. 4-7, another embodiment of the invention is shown which is substantially identical to that of FIGS. 1-3 except for the addition or substitution of elements which terminate the scanning operation and reset the magnetic head to its original position. In order to avoid redundancy, reliance is made upon the foregoing discussion for describing those parts shared in common by both embodiments.

Instead of belt 11, the driving mechanism of the scanning device of FIGS. 4-7 employs idler disc 27 engaging pulley 9 and driving ring 7. Idler disc 27 supported on arm 28 is operationally biased by spring 41. By providing such a means for driving the scanning device, as will become subsequently apparent hereinafter, the rotation of rotary disc 6 can be started or terminated in a predetermined manner.

As before, cam member 19, in operation, rotates clockwise under the influence of planetary pulley 12 via idler wheel 16. One noticeable difference is, however, that idler wheel 16 and cam member 19 are mounted on an idler arm having a different shape from that of FIGS. 1-3. For this reason, the idler arm of this embodiment has been designated 15'. The central portion of idler arm 15' from arm axis 23 through axis 20 functions exactly as idler arm 15 of the first embodiment. The addition of extended end portion permits, as will be explained in greater detail hereinafter, idler arm 15' to cooperatively engage release lever 34 and stopping lever 35.

Figure 7:
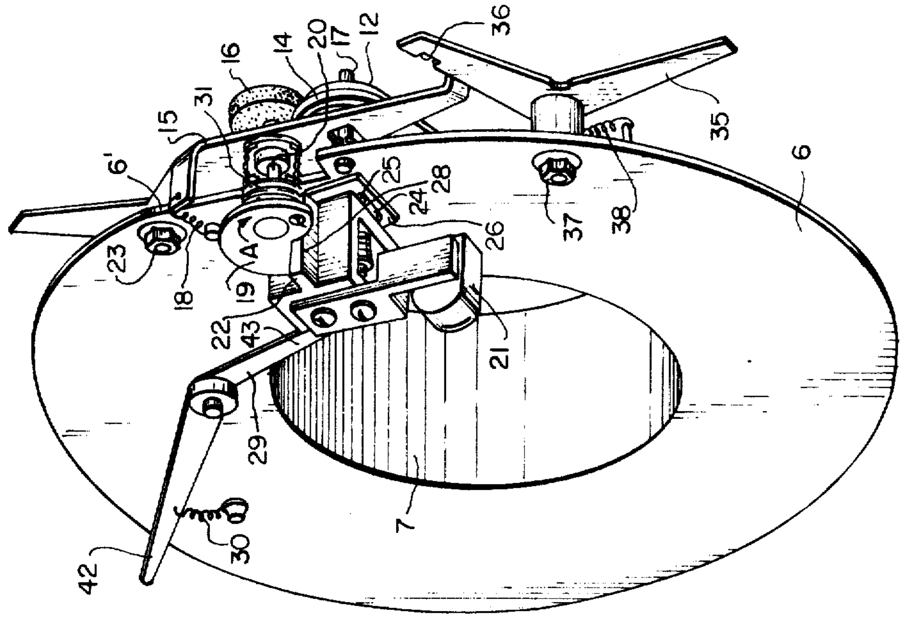
FIG. 7 is a perspective view of a portion of the embodiment of FIG. 4.

As best shown in FIG. 7, support arm 22 displaced radially by cam member 19 is slidably mounted by means of leg 25 in opening 24 of guide member 26. Necessarily, opening 24 establishes the absolute meets and bounds of supporting arm 22 and, consequently, magnetic head 21.

Engaging the front face of magnetic head 21 is leg 43 of L-shaped resetting lever 29 which is rotatably mounted on rotary disc 6. Leg 43 forces supporting arm 22 to constantly engage the cam surface of cam member 19 due to the biasing effect of spring 30 connected to the other leg, leg 42, of resetting lever 29. Leg 42 of resetting lever 29 is adapted when leg 43 detects the terminal position of magnetic head 21, to close or actuate switch 32 which in turn causes release lever 34 to rotate idler arm 15' against the tension of spring 18 by energizing plunger means 33. This counterclockwise rotation of idler arm 15' releases idler wheel 16 from engagement with rotating axis 17 of the planetary wheel means.

In order to return magnetic head 21 outwardly in the radial direction to its original starting position, an elastic means such as coil spring 31 (see FIG. 7) having one terminal connected to cam 19 and the other terminal secured to rotary disc 6 is disposed along axis 20 of idler wheel 16. Coil spring 31 is wound to energize cam 19 in a counterclockwise direction so that the contacting part of supporting arm 22 confronts the point of minimum diameter of cam member 19 at the starting position of the spiral scanning. If necessary, a stopper (not shown) could be added. Coil spring 31 stores potential energy for resetting cam member 19 in a counterclockwise direction when cam member 19 is driven in a clockwise direction by idler wheel 16 during the scanning period. As is by now apparent, when idler arm 15' is rotated counterclockwise by release lever 34, the disengagement of idler wheel 16 and rotating axis 17 allow coil spring 31 to return cam mechanism 19 and thus magnetic head 21 to their starting positions.

At the same time, idler 15' rotates into engagement with slotted portion 36 of stopping lever 35. This lever rotatably connected at pivot 37 to rotary disc 6 and biased by spring 38 is arranged, when the slotted portion 36 engages idler arm 15', to trip or actuate electrical switch 39. Electrical switch 39 is operatively connected to plunger means 40 for retracting idler disc 27 against spring 41 biasing arm 28. In the retracted position idler disc 27 no longer transmits driving force to rotary disc 6.

In operation, when electric motor 2 is energized rotary disc 6 begins to rotate clockwise by way of idler disc 27. With the clockwise rotation of rotary disc 6, planetary pulley 12 not only revolves clockwise on the axis of rotary disc 6 but also turns around in counterclockwise fashion on its own axis with the aid of connecting belt 14, which connects said planetary pulley 12 with cylindrical part 13 and further rotates, via idler wheel 16, cam member 19 in the direction shown. Supporting arm 22 following the Archimedian curve of cam member 19 is thus shifted slidably to the center of rotary disc 6 in a radial direction.

Since the magnetic head 21 rotates on the axis of rotary disc 6 and also is shifted radially to the center thereof, magnetic head 21 moves along a spiral locus in a parallel plane, in normal operation, to a sheet coated with a magnetic material. During the shifting movement of magnetic head 21, coil spring 31, having a terminal tied to cam member 19 is wound to store kinetic energy for revolving and resetting cam member 19 in a counterclockwise direction.

Figure 6:
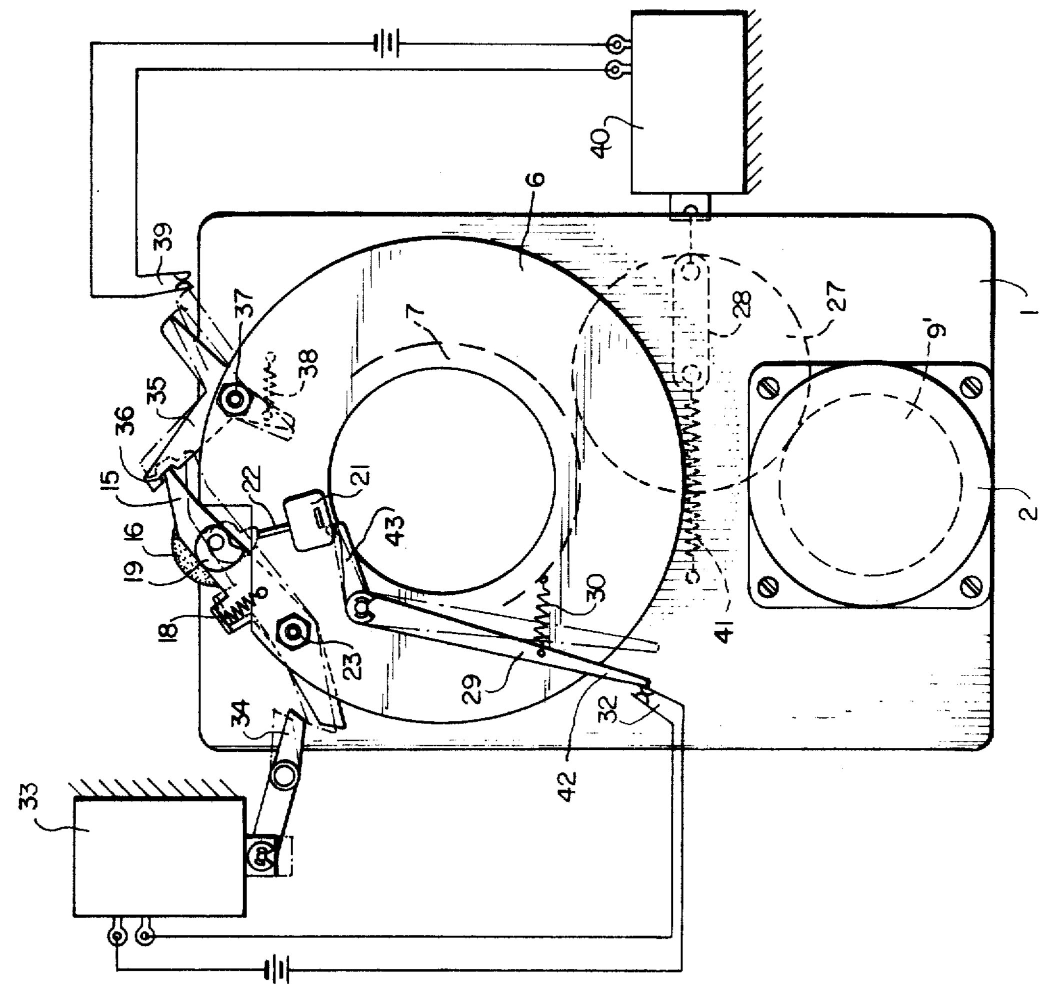
FIG. 6 is a partial frontal view of the embodiment of FIG. 4 wherein the magnetic head has reached a predetermined radial end position.

Then, as shown in FIG. 6, resetting lever 29 moves from a position as shown by the dotted line to a new position as shown in dark about its pivot axis when magnetic head 21 has shifted completely to the scanning end. Accordingly, detecting switch 32 is closed by leg 42 of lever 29 and plunger means 33 is actuated to rotate releasing lever 34 to the position shown in dark. Although not illustrated, plunger means 33 is maintained in an actuated state with means such as self-holding circuits.

With the rotation of rotary disc 6, the free leg of idler arm 15' eventually engages release lever 34 to rotate the other leg of idler arm 15' into slotted portion 36 of stopping lever 35 which also rotates counterclockwise on pivot 37 from a position as shown by the dotted line to a new position as shown in dark.

The other edge of said stopping lever 35 turns on electrical switch 39 at the latter position with the rotation of said rotary disc 6 to actuate plunger means 40 which is so maintained by certain self-holding means or the like, to pull out idler disc 27 on arm 28 against spring 41. Idler disc 27 is thus disengaged from pulley 9' and the driving ring 7 of said rotary disc 6 to stop the rotation of rotary disc 6.

When said idler arm 15' on which idler wheel 16 is mounted for rotating cam member 19, is held at the slotted portion 36 of stopping lever 35, idler wheel 16 is released from rotating engagement with rotating axis 17. In that situation, idler wheel 16 as well as cam member 19 are free of rotation on their axis 20 and, accordingly, revolve in the counterclockwise by means of the potential kinetic energy stored in coil spring 31. Referring to FIG. 7, it is clear that supporting arm 22 of magnetic head 21 is kept in contact with the guiding surface of cam member 19 by leg 43 of resetting lever 29 under the biasing effect of spring 30. Therefore, the edge of supporting arm 22 confronts the least diametrical position of cam member 19 at its resetting position as defined by guiding member 26 together with the shape of opening 24. A certain clearance should exist between supporting arm 22 and the confronting surface of cam member 19 at the resetting position of said magnetic head 21 to allow for releasing idler arm 15' from slotted portion 36.

For repeating the scanning of magnetic head 21 along the same spiral locus, operating means (not shown) can be provided, which can be operated not only manually but also automatically, synchronizing with the change of a slide frame. The operating means should also disenergize both plunger means 33 and 40 to subsequently release idler arm 15' from stopping lever 35 and to set supporting arm 22 in a mechanically following position on the surface of cam member 19.

As described before in detail, since whole mechanical parts such as planetary pulley 12 mounted on rotary disc 6 driven by electric motor 2, idler wheel 16 engaging with planetary pulley 12, cam member 19 coaxially-fixed on axis 20 of said idler wheel 16 and magnetic head 21 slidably mounted radially along rotary disc 6 are mounted on the supporting member 1 as a unit without requiring a guiding plate as in the prior art, the present invention provides a structurally simple low cost magnetic head scanning device which is able to scan exactly along a predetermined locus. The present invention further offers easy handling in assembling and maintenance. Furthermore, since cam member 19 is designed to be automatically resettable by means of coil spring 31, which stores the kinetic energy during scanning of the magnetic head 21, when the scanning end is detected by said resetting lever 29, preparation necessary for subsequent spiral scanning is ready immediately and automatically.

While several embodiments of the invention have been shown and described, other variations will be readily apparent to those skilled in the art. Therefore, the invention is not limited to these embodiments but is intended to cover all such variations as may be within the scope of the invention defined by the following claims:

What is claimed is:

1. A scanning device for a magnetic recording or reproducing apparatus comprising:

a. a support member, b. a rotary disc rotatably mounted on said support member, c. a motor means mounted on said support means for driving said rotary disc, d. a radially-movable magnetic head mounted on said rotary disc, e. an engaging member, fixedly attached to said support member, said support member having a circular surface with a center coinciding with the center of rotation of said rotary disc, f. a planetary wheel means rotatably mounted on said rotary disc, g. connecting means operatively coupling said engaging member and said planetary wheel means for rotating said planetary wheel means about its axis upon the rotation of said rotary disc, and h. motive means operatively coupling said planetary wheel means and said magnetic head to translate the rotational movement of said planetary wheel means into the radial movement of said magnetic head, whereby the locus of movement of said magnetic head is a spiral.

2. The scanning device of claim 1 wherein said motive means includes a rotatable cam member having a cam surface for shifting said magnetic head.

3. The scanning device of claim 2 wherein said motive means includes an idler wheel mechanically-connected to said cam member to co-rotate therewith, said idler wheel being adapted to rotatably engage said planetary wheel means.

4. The scanning device of claim 3 wherein the axis of rotation of said idler wheel is disposed in a first end portion of an idler arm pivotally-connected to said rotary disc, said idler arm being spring-biased to maintain said idler in rotational engagement with said planetary wheel means.

5. The scanning device of claim 4 wherein said magnetic head is connected to one end of a supporting arm, the other end of which engages said cam surface of said cam member.

6. The scanning device of claim 1 wherein said engaging member is a ring-shaped member, the outer circumference of which is disposed closer to the center of rotation of said rotary disc than is the furthest point of said planetary wheel means and said planetary wheel means includes a planetary pulley; and wherein said connecting means is a belt, said belt engaging said planetary pulley and said ring shaped member.

7. The scanning device of claim 6 wherein said rotary disc includes a coaxially-mounted driving ring, said ring being adapted to be circumferentially-rotated by a belt connected to said motor means.

8. The scanning device of claim 1 further comprising detecting means for sensing at least a predetermined radial end position of said magnetic head; and first operative means energized by said detecting means upon sensing said end position to disengage said motive means from shifting said magnetic head and to reset said magnetic head back to a predetermined radial starting position.

9. The scanning device of claim 8 further comprising an elastic means for storing kinetic energy corresponding to the displacement of said magnetic head from the predetermined radial starting position whereby, upon said disengagement of said motive means, said elastic means automatically resets said magnetic head to said predetermined radial starting position.

10. The scanning device of claim 8 further comprising second operative means for disengaging said motor means from rotating said rotary disc when said detecting means senses said predetermined radial end position of said magnetic head.

11. The scanning device of claim 8 wherein said motive means includes a rotatable cam member having a cam surface shifting said magnetic head.

12. The scanning device of claim 11 wherein said motive means further includes an idler wheel mechanically-connected to said cam member to co-rotate therewith, said idler wheel being adapted to rotatably engage said planetary wheel means.

13. The scanning device of claim 12 wherein said first operative means disengages said idler wheel and said planetary wheel means.

14. The scanning device of claim 13 further comprising an elastic means associated with said cam member for storing kinetic energy corresponding to the displacement of said magnetic head from said predetermined radial starting position whereby, upon the disengagement of said idler wheel and said planetary wheel means, said elastic means automatically resets said cam member to its initial rotational position which corresponds to said predetermined radial starting position of said magnetic head.

15. The scanning device of claim 13 wherein the axis of rotation of said idler wheel is disposed in a first end portion of an idler arm pivotally-connected to said rotary disc, said idler arm being spring-biased to maintain said idler wheel in rotational engagement with said planetary wheel means.

16. The scanning device of claim 15 wherein said idler arm includes a second end portion, said first operative means being adapted to engage said second end portion to rotate said idler arm in a direction disengaging said idler wheel and said planetary wheel means.

17. The scanning device of claim 16 wherein said detecting means comprises a spring-biased resetting lever pivotally connected to said rotary disc, one end of which engages said magnetic head; and said first operating means comprises a release lever displaced from said rotary disc and adapted to engage said second end portion of said idler arm; a plunger means for actuating said release lever; and an electrical switch for actuating said plunger means when the other end of said resetting lever comes in contact therewith, said other end of said resetting lever and said electrical switch being positioned relatively such that contact occurs at the predetermined radial end position of said magnetic head.

18. The scanning device of claim 17 wherein said rotary disc includes a coaxially-mounted driving ring; said motor means is provided with an axially-driven pulley in parallel with said driving ring; an idler disc is retractably disposed therebetween to transmit rotary motion to said rotary disc; and a second operative means is provided adapted to retract said idler disc when said detecting means senses said predetermined radial end position of said magnetic head.

19. The scanning device of claim 18 wherein said second operative means includes an electrically-actuated plunger means for retracting said idler disc, an electrical switch for actuating said plunger means and a stopping lever pivotally connected in a middle portion to said rotary disc and having a pair of ends, one end being adapted to engage said first-end portion of said idler arm, when said idler arm is rotated in a disengaging direction by said first operative means, in a manner such that the other end of said stopping lever actuates said electrical switch of the second operative means.

20. The scanning device of claim 19 wherein said one end of said stopping lever is provided with a slotted portion for receiving the top of said first end portion of said idler arm, when said idler arm is rotated in said disengaging direction.

* * * * *